(12) United States Patent
Maddern et al.

(10) Patent No.: US 10,055,211 B2
(45) Date of Patent: Aug. 21, 2018

(54) USE-CASE-BASED APPLICATION INSTALLATION AND SWITCHING TO A SECOND APPLICATION TO PERFORM AN ACTION

(71) Applicant: Button Inc., New York, NY (US)

(72) Inventors: Christopher James Maddern, New York, NY (US); Wesley Duncan Smith, Staten Island, NY (US)

(73) Assignee: Button Inc., New York, NY (US)

( * ) Notice: Subject to any disclaimer, the term of this patent is extended or adjusted under 35 U.S.C. 154(b) by 0 days.

(21) Appl. No.: 14/965,152

(22) Filed: Dec. 10, 2015

(65) Prior Publication Data

US 2016/0170731 A1 Jun. 16, 2016

Related U.S. Application Data

(60) Provisional application No. 62/090,033, filed on Dec. 10, 2014.

(51) Int. Cl.
*G06F 9/445* (2018.01)
*G06F 8/61* (2018.01)
*G06Q 20/12* (2012.01)

(52) U.S. Cl.
CPC ............... *G06F 8/61* (2013.01); *G06Q 20/12* (2013.01); *G06Q 20/123* (2013.01)

(58) Field of Classification Search
None
See application file for complete search history.

(56) References Cited

U.S. PATENT DOCUMENTS

| 2008/0040389 A1 | 2/2008 | Seth et al. |
| 2008/0242284 A1 | 10/2008 | Vechey et al. |
| 2012/0036003 A1* | 2/2012 | Tong ................. G06Q 30/0207 705/14.39 |

(Continued)

FOREIGN PATENT DOCUMENTS

WO  WO2013147725  10/2013

OTHER PUBLICATIONS

International Search Report and Written Opinion of the International Searching Authority issued in International Application No. PCT/US2015/064951 dated Mar. 1, 2016; 7 pages.

(Continued)

*Primary Examiner* — Qamrun Nahar
(74) *Attorney, Agent, or Firm* — Fish & Richardson P.C.

(57) ABSTRACT

The present disclosure describes methods, systems, and computer program products for providing contextual ecommerce shopping cart adjustments. An indication of an expressed intent to perform an action not available in a first application is received. One or more applications capable of fulfilling the action are requested from a Service, the request to the Service including available contextual data. A policy and a list of applications that can fulfill the action are received. A second application is selected to perform the action based on the policy. A response is received from a transmitted query to an operating system to determine if the second application is installed, wherein the response indicates whether the second application is installed. The second application is installed if the second application is not installed. A deep link is executed into the second application so that the second application can automatically perform the action.

20 Claims, 5 Drawing Sheets

(56) References Cited

U.S. PATENT DOCUMENTS

2012/0042036 A1* 2/2012 Lau .......................... G06F 8/61
                                                            709/217
2012/0124061 A1  5/2012 Macbeth et al.
2013/0111328 A1* 5/2013 Khanna ............... G06F 17/3089
                                                            715/234

OTHER PUBLICATIONS

Extended European Search Report, European Application No. 15866816.0, dated Jun. 5, 2018, 8 pages.

* cited by examiner

USE-CASE-BASED APPLICATION INSTALLATION AND SWITCHING TO A SECOND APPLICATION TO PERFORM AN ACTION

CROSS-REFERENCE TO RELATED APPLICATIONS

This application is claims the benefit of priority to U.S. Provisional Patent Application Ser. No. 62/090,033, filed on Dec. 10, 2014, the contents of which are hereby incorporated by reference.

BACKGROUND

Currently, mobile applications are installed from a 'Store' (e.g., an "App" or "Application" store). Once installation is complete, an icon appears somewhere on a home screen or in a list of applications. It is possible to install an application from within another application on most platforms (ANDROID & IOS being the two most popular which support this idea), but the application is placed on a home screen or in an application list where it must later be found and opened. No state or intent is transferred to the newly opened application. Applications do not commonly include functionality that allows performance of actions in applications other than an application currently in use. This is often achieved using Deep Linking, a custom URL protocol registered to an individual application that describes a specific action to perform or content to display. Currently, the actions of installing an application and performing a specific action or viewing specific content within that application once installed are separate.

SUMMARY

The present disclosure relates to computer-implemented methods, computer-readable media, and computer systems for binding activities such that a user, using an application, can express intent to perform an action in another application that is not yet installed on the user's device. The application able to perform the expressed action will be installed, and then the action is automatically performed in the newly installed application.

An indication of an expressed intent to perform an action not available in a first application is received. One or more applications capable of fulfilling the action are requested from a Service, the request to the Service including available contextual data. A policy and a list of applications that can fulfill the action are received. A second application is selected to perform the action based on the policy. A response is received from a transmitted query to an operating system to determine if the second application is installed, wherein the response indicates whether the second application is installed. The second application is installed if not already installed. A deep link is executed into the second application so that the second application can automatically perform the action.

Implementations of this aspect include computer systems, apparatuses, and computer programs recorded on one or more computer storage devices, each configured to perform the actions of the described methods. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

For example, in an implementation, a computer-implemented method includes receiving an indication of an expressed intent to perform an action not available in a first application; requesting one or more applications capable of fulfilling the action from a Service, wherein the request to the Service includes available contextual data; receiving a policy and a list of applications that can fulfill the action; selecting a second application to perform the action based on the policy; receiving a response from a transmitted query to an operating system to determine if the second application is installed, wherein the response indicated whether the second application is installed; installing the second application if the second application was not installed; and executing, by a computer, a deep link into the second application so that the second application can automatically perform the action.

The foregoing and other implementations can each optionally include one or more of the following features, alone or in combination:

In a first aspect, combinable with any of the general implementations, wherein the received list of applications that can fulfill the action is prioritized.

In a second aspect, combinable with any of the general implementations, comprising enumerating the list of applications that can fulfill the action.

In a third aspect, combinable with any of the general implementations, comprising triggering an operating system to install the second application.

In a fourth aspect, combinable with any of the general implementations, comprising determining whether the second application is installed.

In a fifth aspect, combinable with any of the general implementations, comprising, following the determination whether the second application is installed, determining whether a timeout period has elapsed.

In a sixth aspect, combinable with any of the general implementations, wherein the deep link uses a custom uniform resource locator (URL) protocol registered to the second application that describes a specific action to perform or content to display using the second application.

The subject matter described in this specification can be implemented in particular implementations so as to realize one or more of the following advantages. First, a user's expressed intent in a first application to perform an action in a second application not installed on a user's mobile (or other) device can automatically result in the second application being installed and the action performed. Second, if the user's intent can be performed on an alternate second application installed on the user's device, the action can be performed using the alternative second application and the user can receive an offer to install the second application not installed on the user's device (and even be incentivized to perform the installation). If none of the second applications are installed on the user's device, the first application will initiate a harnessed install of the preferred second application (as determined by the priority sent from the server, or some other metric). For example, this could use some mechanism likely provided by the Operating System the first application is currently running on—e.g., SKStoreProductViewController on IOS or Intent on ANDROID. Note that these can vary from platform to platform and change over time. Other advantages will be apparent to those skilled in the art based on the following disclosure.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations, but is to be accorded the widest scope consistent with the principles and features disclosed herein.

The present disclosure describes ONETAP INSTALL, which includes techniques for binding activities such that a user, using an application, can express intent to perform an action in another application which is not yet installed on the user's device and able to perform the expressed action will be installed, and then the action is automatically performed in the newly installed application.

Use-Case Example

A user is in an application for reserving a table at a restaurant and has successfully reserved their table; reservation to start in 30 minutes' time. Now the user needs to get to the restaurant, and the application offers the functionality to 'get a ride' to the restaurant. The restaurant reservation application doesn't know how to get the user a car to the restaurant, so it defers to a service that knows how to find services that can fulfill this use-case.

The application requests from this service a list of all applications that know how to perform a 'get a ride' use-case at the user's current location. The server will respond with a list of all such applications, along with how to detect if they are installed, install them if necessary, and how to transfer the intent of the use-case to that Application (e.g., with a deep link).

The application will then determine if any of those apps are installed. If they are, it can be configured to handle the action using that application (e.g., if UBER & LYFT are returned and LYFT is installed, it could perform the action immediately by deep linking to LYFT). It could also be configured to offer the user to install the second application (e.g., in this case, UBER) and even incentivize the user to install that second application.

If none of the applications returned are installed on the device, the application will initiate a harnessed install of the preferred application (as determined by the priority sent from the server, or some other metric). This will use some mechanism (likely that provided by the Operating System the Application is currently running on). For example, SKStoreProductViewController on IOS or an Intent on ANDROID (but these vary from platform to platform and change over time).

In some implementations, the application will install the second application synchronously, and the user will wait in some loading UI (the application can remain in this state until the second application is installed). In some other implementations, the application could be notified when the second application has been installed either through some provided notification by the OS or by polling for the existence of the second application until it is present (the application does not have to remain in a particular state).

Once the second application is installed, the first application will trigger the user to be moved to the second application along with their requested action using the method that was returned to it by the service. In one example implementation, this could be a deep link that the first application passes to the Operating System to open. In this example, this would mean that the user would be in a transportation application (e.g., UBER) with their destination prepopulated and they are ready to request their car.

Generalization

Application A offers to a user an action that cannot be handled by application A. Application A requests from some service ("the Service") a list of other applications that can handle this action, along with how to perform the action, and returns that list to application A.

In some implementations, the Service determines which applications to return based on context received from application A and from other data service providers (e.g., external data providers). Such contextual data might include user location, time of a reservation, weather, and/or the like.

Other data can also be incorporated into the decision from services accompanying applications that are being considered to perform the user's intended action. For example, the Service might ask an UBER API service if there are any cars available near the user's location and choose to respond to application A with UBER as an option for fulfilling the user's intended action depending on the response from UBER's API service.

Once application A receives the response from the Service with the applications that can perform the action, application A then either opens one of those applications (henceforth referred to as application B) with the provided method (if installed) or chooses an application to install (i.e., chooses application B). Application A then synchronously installs application B and opens application B with the provided method (once installed).

Application B will be opened and will receive the request for the content or action passed by application A. Application B will optionally report the successful opening of application B (with application A as the referrer). Application B can then perform the action or show the content indicated by the request from application A.

In some instances, application B can optionally present a way to go back to application A (e.g., either persistently inside of application B or once the key action has been completed in application B). In some implementations, this could take the form of a button or selectable (e.g., tapping, swiping, pinching, etc.) region.

Attended Installation (ONETAP INSTALL)

A synchronous way to install an application that will be opened and context passed after installation is complete is described. This can be achieved by triggering the installation and then waiting for the application installation to be complete. Then, the application can be opened and the intended action is passed by some method (e.g., most commonly a deep link, but other methods are considered to be within the scope of this disclosure).

Compatibility

This system/method can be used on any platform that provides at least the following capabilities:

The ability to trigger the installation of an application (or present the user with a screen where they can do so) from within another application The ability to detect whether a given application is installed The ability to open a second application from an application.

Figure 1A:
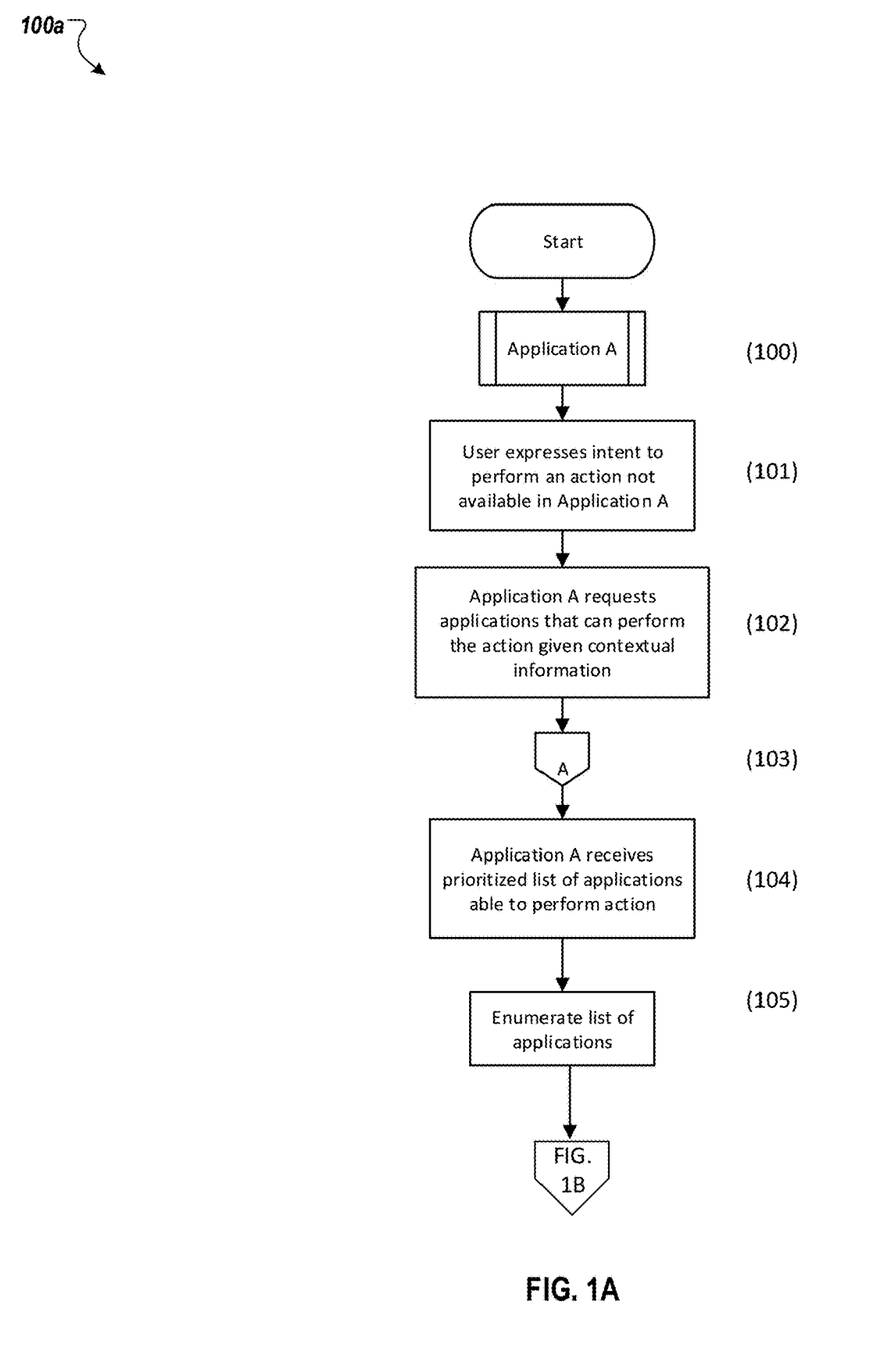
FIG. 1A is a flow chart of a method illustrating, with respect to an application, binding activities such that a user, using an application, can express intent to perform an action in another application which is not yet installed on the user's device, according to an implementation.

FIG. 1A is a flow chart of a method 100a illustrating, with respect to an application, binding activities such that a user, using an application, can express intent to perform an action in another application that is not yet installed on the user's device according to an implementation. For clarity of presentation, the description that follows generally describes method 100a in the context of FIGS. 1B and 2-4. However, it will be understood that method 100a may be performed, for example, by any other suitable system, environment, software, and hardware, or a combination of systems, environments, software, and hardware as appropriate. In some implementations, various steps of method 100a can be run in parallel, in combination, in loops, and/or in any order.

At 100, a user begins in application A. From 100, method 100a proceeds to 101.

At 101, a user taps a button or otherwise indicates a desire to perform an action not available in application A but that requires the user to be transported to another application, henceforth referred to as application B. From 100, method 100a proceeds to 102.

At 102, application A requests from a web service a list of applications that can perform the action requested by the user. In some implementations, this request may be made by means of a Software Development Kit (SDK) provided to the developer of application A. From 102, method 100a proceeds to 103.

At 103, the Service performs steps 200-210 (refer to FIG. 2) and returns a structured list of applications that can be used to perform the action requested. From 103, method 100a proceeds to 104.

At 104, application A receives the list of applications generated that can be used to fulfill the action. From 104, method 100a proceeds to 105.

At 105, the application performs steps 106-108 (refer to FIG. 1B) for each of the applications received from the service. From 105, method 100a proceeds to 106 (in FIG. 1B).

Figure 1B:
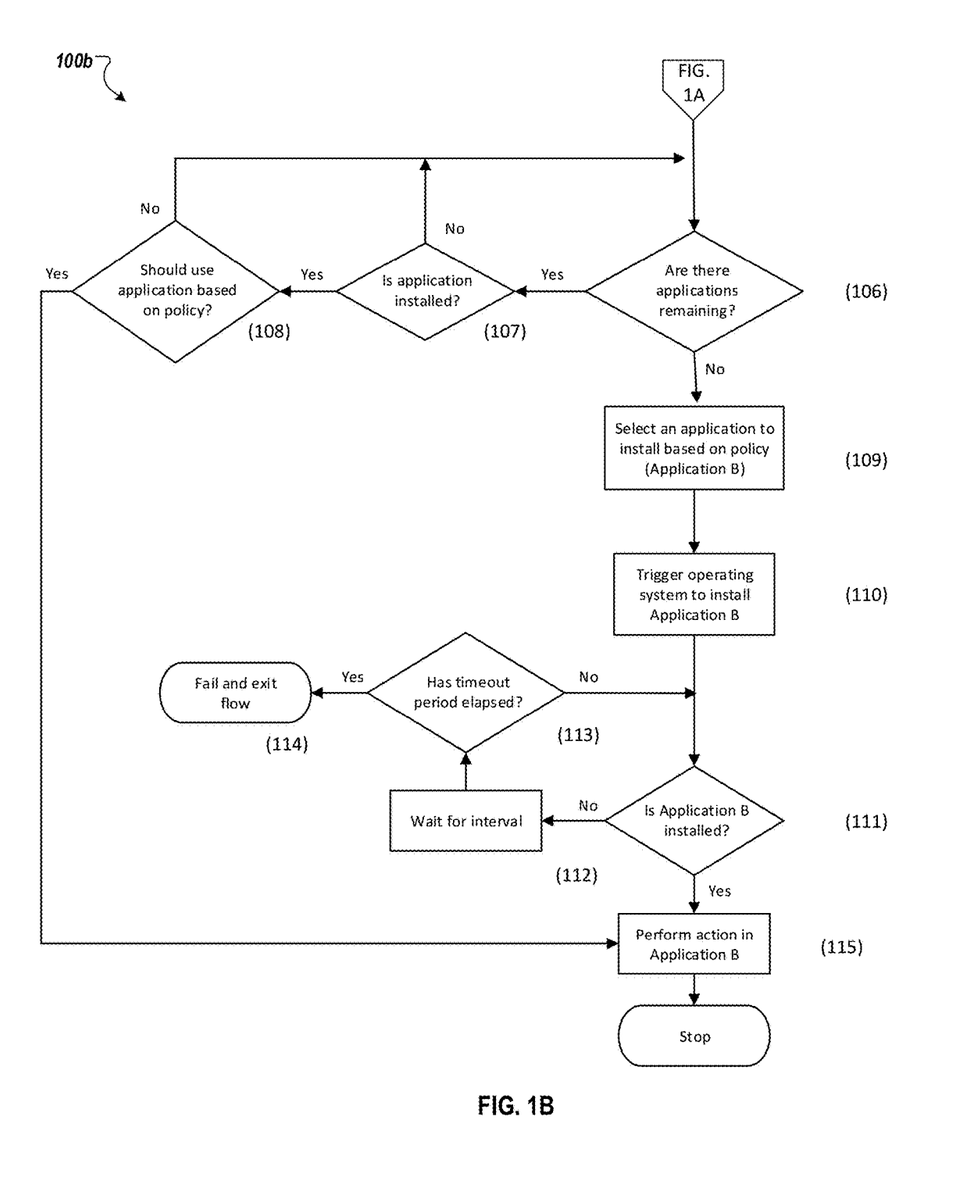
FIG. 1B is a flow chart of a method (continuing the method of FIG. 1A) illustrating, with respect to an application, binding activities such that a user, using an application, can express intent to perform an action in another application which is not yet installed on the user's device, according to an implementation.

FIG. 1B is a flow chart of a method 100b (continuing method 100a) illustrating, with respect to an application, binding activities such that a user, using an application, can express intent to perform an action in another application that is not yet installed on the user's device according to an implementation. For clarity of presentation, the description that follows generally describes method 100b in the context of FIGS. 1A and 2-4. However, it will be understood that method 100b may be performed, for example, by any other suitable system, environment, software, and hardware, or a combination of systems, environments, software, and hardware as appropriate. In some implementations, various steps of method 100b can be run in parallel, in combination, in loops, and/or in any order.

At 106, if there are remaining applications to be processed, proceed to 107. If there are no remaining applications to be processed, proceed to 109.

At 107, application A determines whether the application described is installed on the device, using information provided in the response payload. In some implementations, this may be achieved by using a Universal Resource Locator Scheme (URL Scheme), which application A then uses to determine whether the Operating System can open that URL, thus informing application A that the application is installed. If the application described is installed, proceed to 108; otherwise, proceed back to 106.

At 108, application A determines whether it should choose the current application to be Application B (the application to install) based on policy provided to Application A from the Service. This could include settings such as favoring applications that are already installed, or those that are not. This policy could also include a white list or black list policy used in determining applications to select or install. If it is determined that an application should be used based on a policy, proceed to 115; otherwise, proceed back to 106.

At 109, based on the policy described heretofore, Application A assigns one returned application 'Application B' and continues with the install process. From 109, method 100b proceeds to 110.

At 110, application A triggers the installation of Application B. In some implementations, this is achieved by requesting the Operating System to begin and manage the installation, although other means of installing applications are also relevant to the application. From 110, method 100b proceeds to 111.

Application A then performs steps 111-114 until such a time that either the determination made in step 111 is affirmative or a timeout period is reached and step 113 aborts the flow 111.

At 111, application A determines whether application B has been successfully installed. In some implementations, this is achieved as described in step 107. If application B has not been successfully installed, method 100 proceeds to 112; otherwise, method 100b proceeds to 115.

At 112, a period of time (e.g., pre-set or dynamically determined) is allowed to pass before checking again. In an example implementation, this could be half a second. From 112, method 100b proceeds to 113.

At 113, application A checks to ensure that the defined timeout period has not been reached. In an example implementation, this could be a minute but will range widely depending on application B's size, network speed, etc. If the defined timeout period has been reached, method 100b proceeds to 114; otherwise, method 100b proceeds back to 111.

At 114, if the timeout period has been reached, application A aborts the flow and returns the user to application A's user interface.

At 115, application A triggers the requested action in application B. In some implementations, this can be achieved using deep linking where a URL is used to pass an action, content, and context to a receiving application. From 115, method 100b stops.

Figure 2:
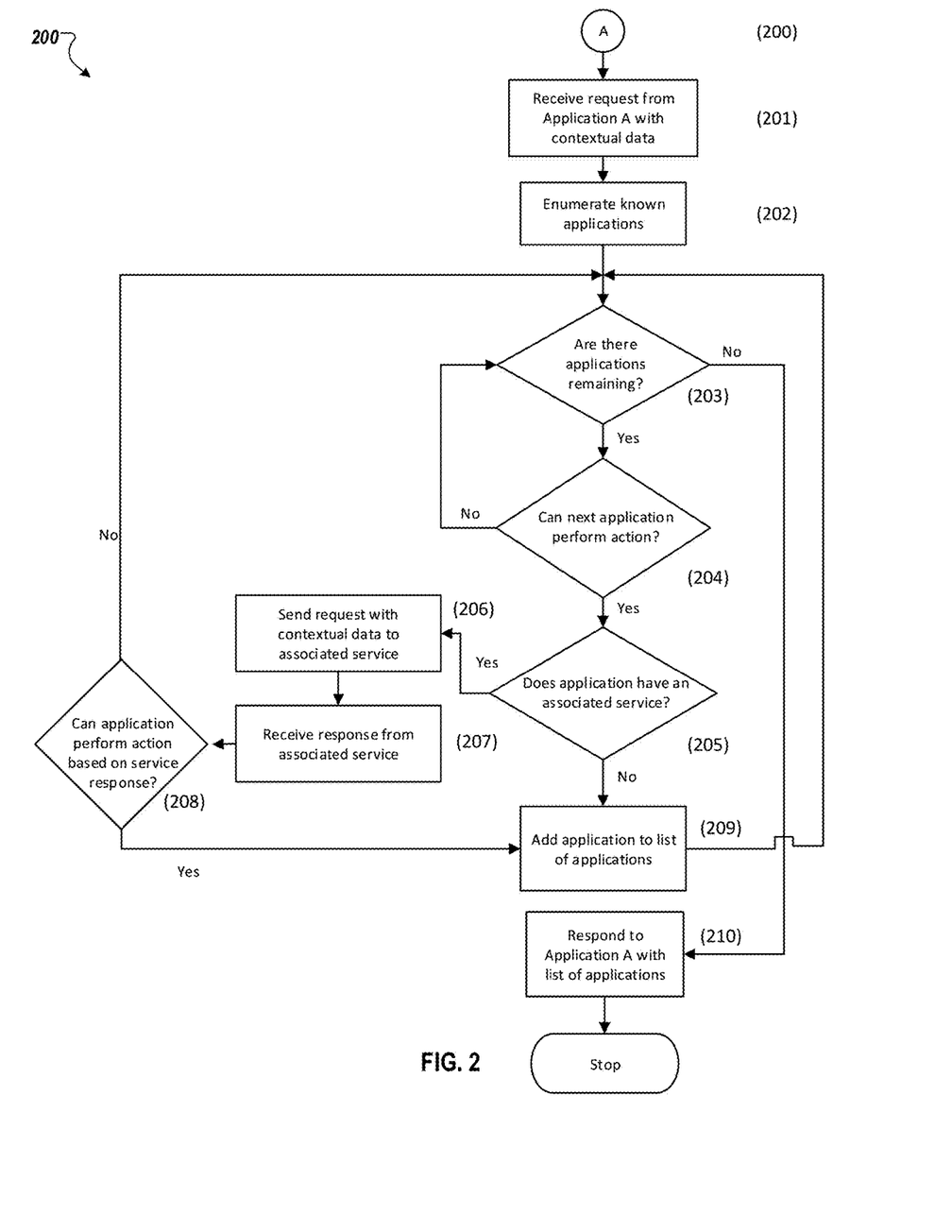
FIG. 2 is a flow chart of a method illustrating, with respect to a service, binding activities such that a user, using an application, can express intent to perform an action in another application which is not yet installed on the user's device, according to an implementation.

FIG. 2 is a flow chart of a method 200 illustrating, with respect to a service, binding activities such that a user, using an application, can express intent to perform an action in another application that is not yet installed on the user's device according to an implementation. For clarity of presentation, the description that follows generally describes method 200 in the context of FIGS. 1A-1B and 3-4. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

At 200, application A has sent a request to the service as indicated in 103. From 200, method 200 proceeds to 201.

At 201, the Service receives a request to return applications that can provide a given service along with all context including but not limited to the device type, operating system, version information, location, local time, device permission status (e.g., push notifications available), other installed applications, the item being displayed in the application at the time (e.g., the location, restaurant, SKU item), network speed, etc. From 201, method 200 proceeds to 202.

At 202, the Service enumerates a list of known applications and performs steps 203-209 for each application. In some implementations, these may be retrieved by fetching them from a database. From 202, method 200 proceeds to 203.

At 203, the Service determines whether it has passed the last application for processing. If so, it proceeds to 210. Otherwise, the Service proceeds to 204.

At 204, the service determines whether the application being processed can perform the action requested by application A. If no, method 200 proceeds back to 203; otherwise, method 200 proceeds to 205.

At 205, the Service determines whether the current application record is configured to check with an outside service to determine whether to offer this application. For example, in the case of an action to book a restaurant table, the application may be configured to check with a booking service whether or not a table at that restaurant is available through the service. In some implementations, this is achieved by using an Application Programming Interface (API) provided by the creator of the application being considered. From 205, method 200 proceeds to 206.

At 206, if there is an outside API to use to determine whether to offer the current application to application A to handle the desired action, the Service passes all relevant information to that API and requests whether the condition to include the present application is met. From 206, method 200 proceeds to 207.

At 207, the response is received from the partner's API with whether or not the application can provide the required action based on the context provided. In an example implementation, this may include a particular restaurant, venue or location, time/date, and/or other factors. From 207, method 200 proceeds to 208.

At 208, the system determines, based on the response from the API in 207, whether the application currently being processed should be added to the list to return to application A. If so, method 200 proceeds to 209; otherwise, method 200 proceeds back to 203.

At 209, the system adds the current application to a list of applications to be returned to application A. From 209, method 200 proceeds to 210.

At 210, the system sends the list generated in the iterations of step 209 to application A by sending a response to the request created in 103. After 210, method 200 stops.

Figure 3:
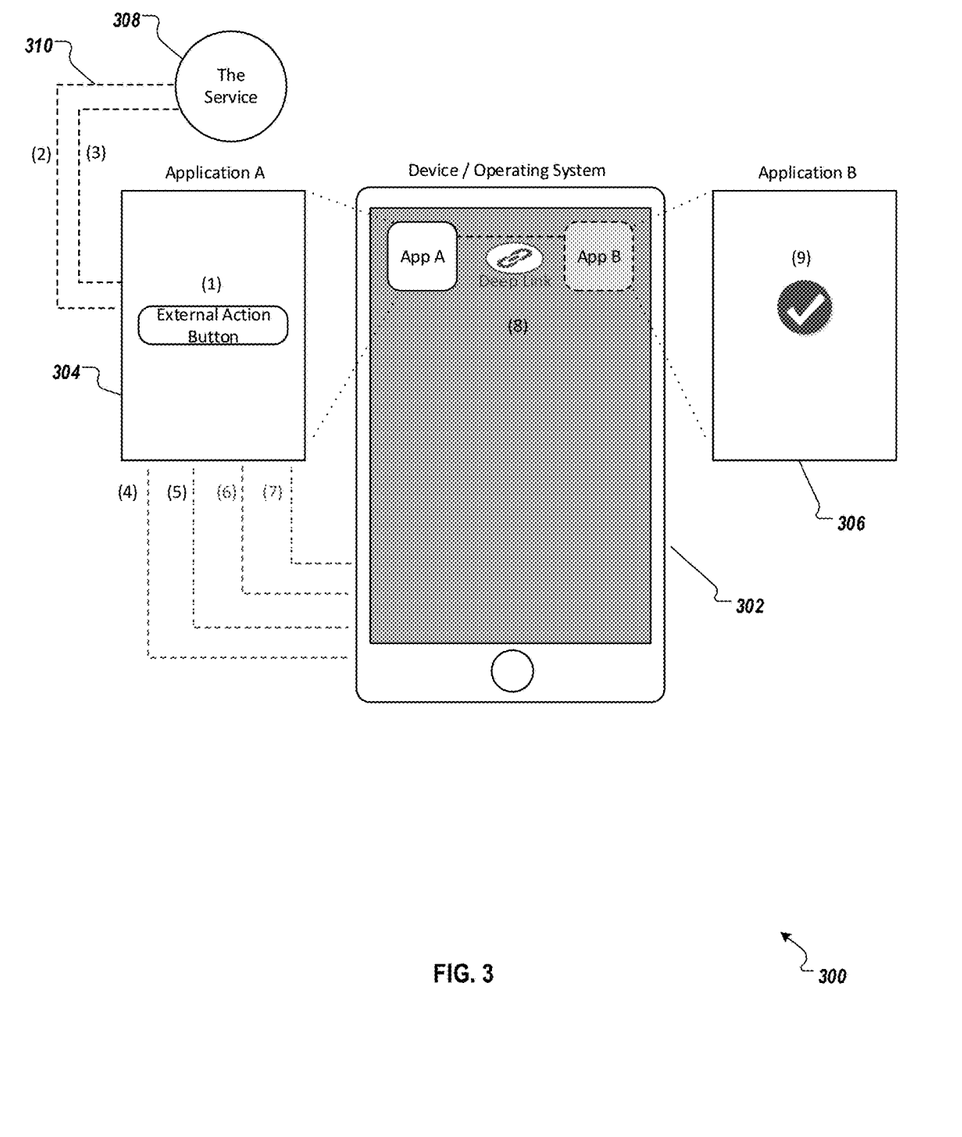
FIG. 3 is a block diagram of an example distributed computing system (EDCS), according to an implementation.

FIG. 3 is a block diagram of an example distributed computing system (EDCS) 300 according to an implementation. EDCS 300 includes, in some implementations, a device/operating system 302 (e.g., a mobile device executing a mobile operating system, etc.). The device/operating system 302 can include an application A 304 and an application B 306. The device/operating system 302 can be connected to a service (e.g., the Service 308) over a network 310. Note that in some implementations, application A 304 and application B 306 can be connected to the device/operating system 302 using a network (e.g., network 310) (although they are illustrated as internal to device/operating system 302 in FIG. 3). Note that a high-level example method flow 312 is described in FIG. 3. In some implementations, method flow 312 is consistent with described methods 100a/b and 200 of FIGS. 1A/B and FIG. 2, respectively, and the rest of the detailed description. In other implementations method flow 312 can deviate from the described methods 100a/b and 200 of FIGS. 1A/B and FIG. 2, respectively, and the rest of the detailed description.

At (1), User expresses intent to perform an action not available in Application A (e.g., using External Action Button). From (1), method flow 312 proceeds to (2). At (2), Application A requests applications capable of fulfilling the action from The Service, passing available contextual data (e.g. location, time, etc.). From (2), method flow 312 proceeds to (3). At (3), The Service returns to Application A the policy and list of apps that can fulfill the action. Application A selects an application (Application B) based on policy. From (3), method flow 312 proceeds to (4). At (4), Application A queries the Operating System to determine if Application B is installed. From (4), method flow 312 proceeds to (5). At (5), Operating System responds indicating whether Application B is installed. From (5), method flow 312 proceeds to (6). At (6), If necessary, Application A instructs Operating System to install Application B. From (6), method flow 312 proceeds to (7). At (7), Operating System completes installing Application B. From (7), method flow 312 proceeds to (8). At (8), Application A executes a Deep Link into Application B. From (8), method flow 312 proceeds to (9). At (9), Application B automatically performs the action.

Figure 4:
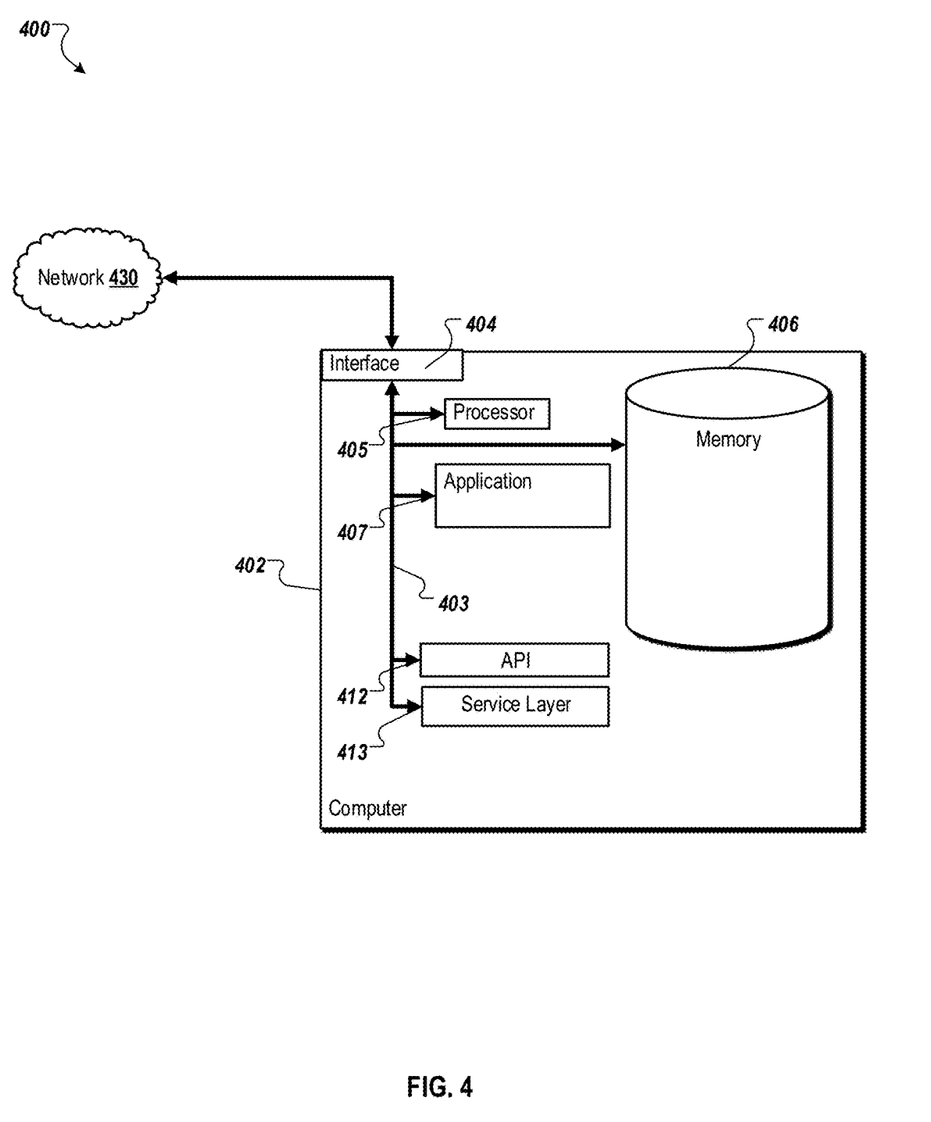
FIG. 4 is a block diagram of an example computer used in the EDCS of FIG. 3, according to an implementation.

FIG. 4 is a block diagram 400 of an example computer 402 used in the EDCS 300 according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 402 may comprise a computer that includes an input device, such as a keypad, keyboard, touch screen, or other device that can accept user information, and an output device that conveys information associated with the operation of the computer 402, including digital data, visual and/or audio information, or a GUI.

In general, the computer 402 can serve as a server, a client, a network component, a database, or other persistency of a computing system. In some implementations, the computer 402 can serve as the Device/Operating System 302, the Service, and/or any other computer system used in the EDCS 300 or connected system (whether or not illustrated), and/or any other component of the EDCS 300. The illustrated computer 402 is communicably coupled with a network 430 (e.g., network 310 in FIG. 3). In some implementations, one or more components of the computer 402 may be configured to operate within a cloud-computing-based environment.

At a high level, the computer 402 is an electronic computing device operable to receive, transmit, process, store, or manage data and information associated with the EDCS 300. According to some implementations, the computer 402 may also include or be communicably coupled with an application server, e-mail server, web server, caching server, streaming data server, business intelligence (BI) server, and/or other server.

The computer 402 can receive requests over network 430 from a service, client application (e.g., executing on another computer 402), etc. and respond to the received requests by processing the said requests in an appropriate software application. In addition, requests may also be sent to the computer 402 from internal users (e.g., from a command console or by another appropriate access method), external or third parties, other automated applications, as well as any other appropriate entities, individuals, systems, or computers.

Each of the components of the computer 402 can communicate using a system bus 403. In some implementations, any and/or all the components of the computer 402, both hardware and/or software, may interface with each other and/or the interface 404 over the system bus 403 using an application programming interface (API) 412 and/or a service layer 413. The API 112 may include specifications for routines, data structures, and object classes. The API 412 may be either computer language-independent or -dependent and refer to a complete interface, a single function, or even a set of APIs. The service layer 413 provides software services to the computer 402 and/or the EDCS 300. The functionality of the computer 402 may be accessible for all service consumers using this service layer. Software services, such as those provided by the service layer 413, provide reusable, defined business functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 and/or the service layer 413 as stand-alone components in relation to other components of the computer 402 and/or EDCS 300. Moreover, any or all parts of the API 412 and/or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402 and/or EDCS 300. The interface 404 is used by the computer 402 for communicating with other systems in a distributed environment—including within the EDCS 300—connected to the network 430 (whether illustrated or not). Generally, the interface 404 comprises logic encoded in software and/or hardware in a suitable combination and operable to communicate with the network 430. More specifically, the interface 404 may comprise software supporting one or more communication protocols associated with communications such that the network 430 or interface's hardware is operable to communicate physical signals within and outside of the illustrated EDCS 300.

The computer 402 includes a processor 405. Although illustrated as a single processor 405 in FIG. 4, two or more processors may be used according to particular needs, desires, or particular implementations of the computer 402 and/or the EDCS 300. Generally, the processor 405 executes instructions and manipulates data to perform the operations of the computer 402. Specifically, the processor 405 executes the functionality required for binding activities such that a user, using an application, can express intent to perform an action in another application that is not yet installed on the user's device.

The computer 402 also includes a memory 406 that holds data for the computer 402 and/or other components of the EDCS 300. Although illustrated as a single memory 406 in FIG. 4, two or more memories may be used according to particular needs, desires, or particular implementations of the computer 402 and/or the EDCS 300. While memory 406 is illustrated as an integral component of the computer 402, in alternative implementations, memory 406 can be external to the computer 402 and/or the EDCS 300.

The application 407 is an algorithmic software engine providing functionality according to particular needs, desires, or particular implementations of the computer 402 and/or the EDCS 300, particularly with respect to functionality required for binding activities such that a user, using an application, can express intent to perform an action in another application that is not yet installed on the user's device. Further, although illustrated as a single application 407, the application 407 may be implemented as multiple applications 407 on the computer 402. In addition, although illustrated as integral to the computer 402, in alternative implementations, the application 407 can be external to the computer 402 and/or the EDCS 300.

There may be any number of computers 402 associated with, or external to, the EDCS 300 and communicating over network 430. Further, the terms "client," "user," and other appropriate terminology may be used interchangeably as appropriate without departing from the scope of this disclosure. Moreover, this disclosure contemplates that many users may use one computer 402, or that one user may use multiple computers 402.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method, comprising:
receiving an indication on a mobile computing device of an expressed intent to perform an action not available in a first application executing on the mobile computing device;
requesting a list of one or more applications capable of fulfilling the action from a contextual application determination Service, wherein the request to the contextual application determination Service includes available contextual data, and wherein the contextual application determination Service is remote from the mobile computing device;
receiving a policy and a list of applications that can fulfill the action;
selecting a second application from the list of applications to perform the action based on the policy;
receiving a response from a transmitted query to an operating system of the mobile computing device to determine if the second application is installed on the mobile computing device, wherein the response indicates whether the second application is installed;
installing the second application on the mobile computing device if the second application is not installed; and
executing a deep link into the second application so that the second application can automatically perform the action.

2. The computer-implemented method of claim 1, wherein the received list of applications that can fulfill the action is prioritized.

3. The computer-implemented method of claim 1, comprising enumerating the list of applications that can fulfill the action.

4. The computer-implemented method of claim 1, comprising triggering an operating system to install the second application.

5. The computer-implemented method of claim 1, comprising determining whether the second application is installed.

6. The computer-implemented method of claim 5, comprising, following the determination whether the second application is installed, determining whether a timeout period has elapsed.

7. The computer-implemented method of claim 1, wherein the deep link uses a custom uniform resource locator (URL) protocol registered to the second application that describes a specific action to perform or content to display using the second application.

8. A non-transitory, computer-readable medium storing computer-readable instructions for providing contextual ecommerce shopping cart adjustments, the instructions executable by a computer and comprising:
receiving an indication on a mobile computing device of an expressed intent to perform an action not available in a first application executing on the mobile computing device;
requesting a list of one or more applications capable of fulfilling the action from a contextual application determination Service, wherein the request to the contextual application determination Service includes available contextual data, and wherein the contextual application determination Service is remote from the mobile computing device;
receiving a policy and a list of applications that can fulfill the action;
selecting a second application from the list of applications to perform the action based on the policy;
receiving a response from a transmitted query to an operating system of the mobile computing device to determine if the second application is installed on the mobile computing device, wherein the response indicates whether the second application is installed;
installing the second application on the mobile computing device if the second application is not installed; and
executing a deep link into the second application so that the second application can automatically perform the action.

9. The non-transitory, computer-readable medium of claim 8, wherein the received list of applications that can fulfill the action is prioritized.

10. The non-transitory, computer-readable medium of claim 8, comprising one or more instructions to enumerate the list of applications that can fulfill the action.

11. The non-transitory, computer-readable medium of claim 8, comprising one or more instructions to trigger an operating system to install the second application.

12. The non-transitory, computer-readable medium of claim 8, comprising one or more instructions to determine whether the second application is installed.

13. The non-transitory, computer-readable medium of claim 12, comprising one or more instructions to, following the determination whether the second application is installed, determine whether a timeout period has elapsed.

14. The non-transitory, computer-readable medium of claim 8, wherein the deep link uses a custom uniform resource locator (URL) protocol registered to the second application that describes a specific action to perform or content to display using the second application.

15. A system, comprising:
a hardware processor interoperably coupled with a computer memory and configured to:
receive an indication on a mobile computing device of an expressed intent to perform an action not available in a first application executing on the mobile computing device;
request a list of one or more applications capable of fulfilling the action from a contextual application determination Service, wherein the request to the contextual application determination Service includes available contextual data, and wherein the contextual application determination Service is remote from the mobile computing device;
receive a policy and a list of applications that can fulfill the action;
select a second application from the list of applications to perform the action based on the policy;
receive a response from a transmitted query to an operating system of the mobile computing device to determine if the second application is installed on the mobile computing device, wherein the response indicates whether the second application is installed;
install the second application on the mobile computing device if the second application is not installed; and
execute a deep link into the second application so that the second application can automatically perform the action.

16. The system of claim 15, wherein the received list of applications that can fulfill the action is prioritized.

17. The system of claim 15, further configured to enumerate the list of applications that can fulfill the action.

18. The system of claim 15, further configured to:
trigger an operating system to install the second application; and
determine whether the second application is installed.

19. The system of claim 18, further configured to, following the determination whether the second application is installed, determine whether a timeout period has elapsed.

20. The system of claim 15, wherein the deep link uses a custom uniform resource locator (URL) protocol registered to the second application that describes a specific action to perform or content to display using the second application.

* * * * *